May 8, 1934.  A. W. KEUFFEL  1,957,838
LEVELING ROD
Filed May 7, 1931  3 Sheets-Sheet 1
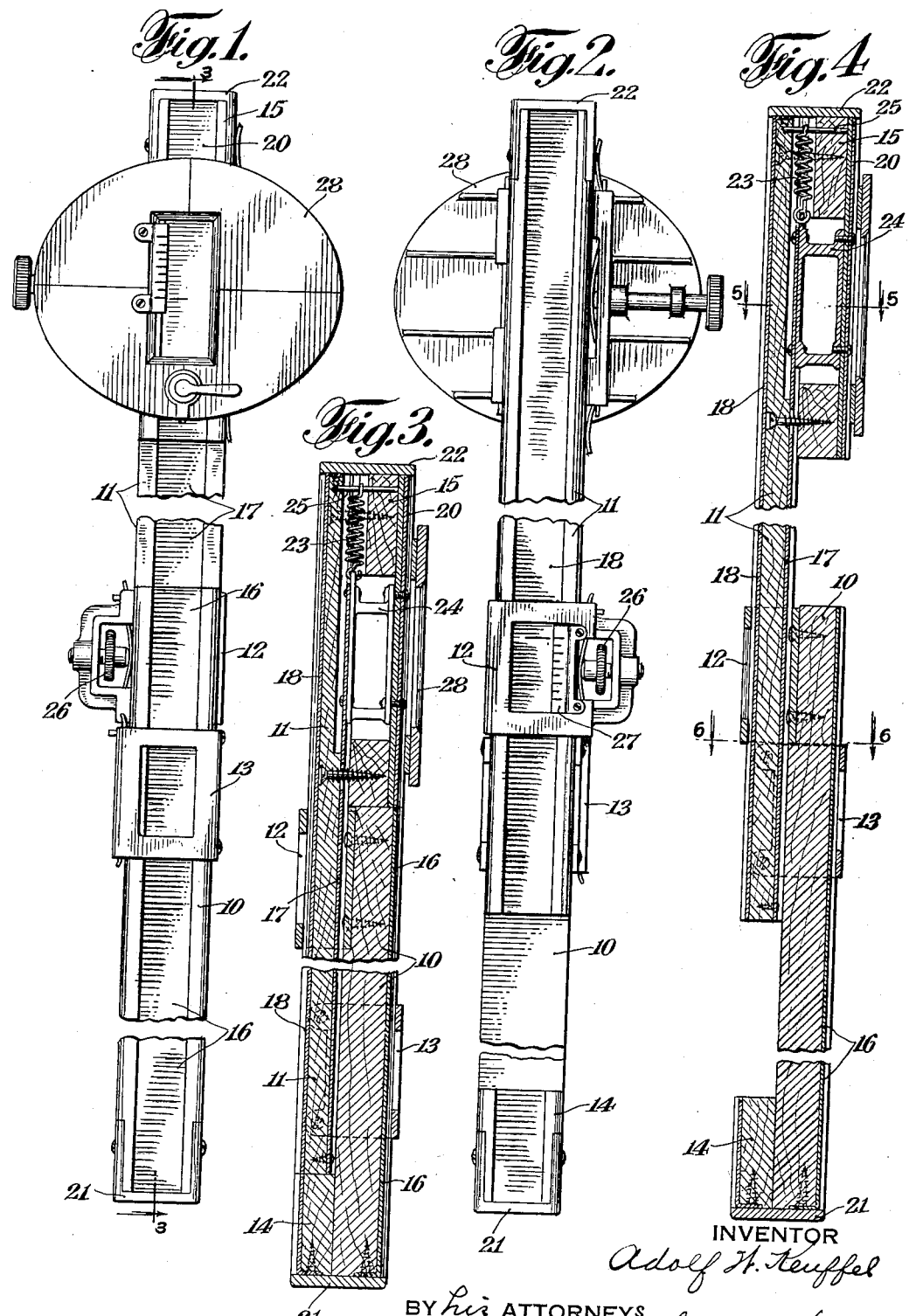

May 8, 1934. A. W. KEUFFEL 1,957,838
LEVELING ROD
Filed May 7, 1931 3 Sheets-Sheet 2
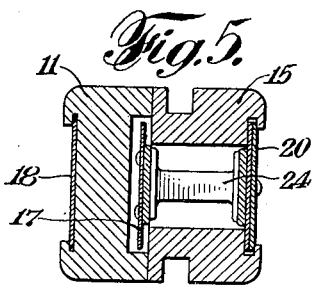
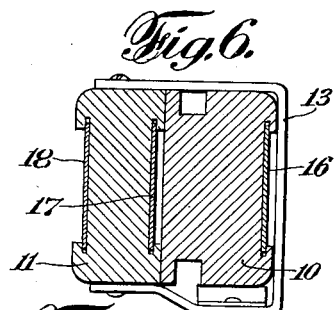
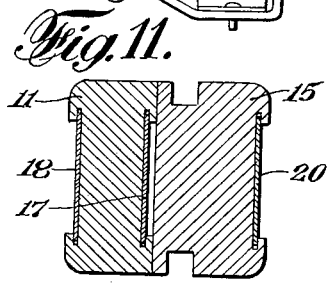
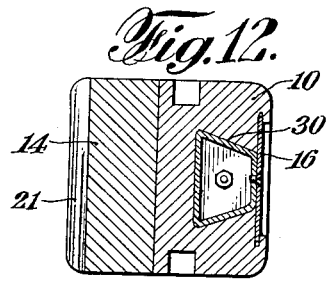
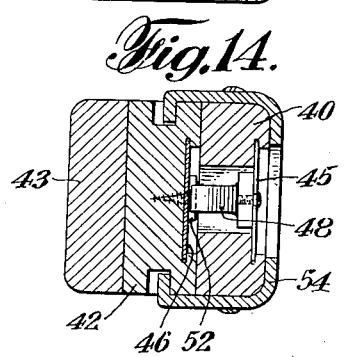
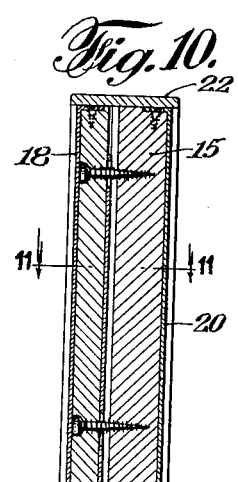
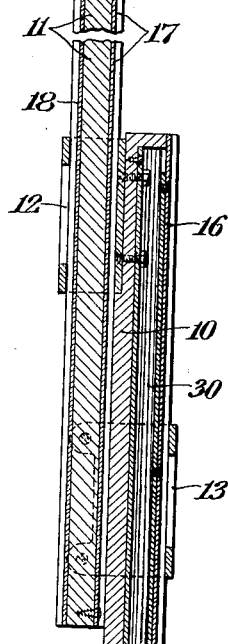
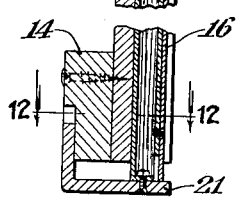
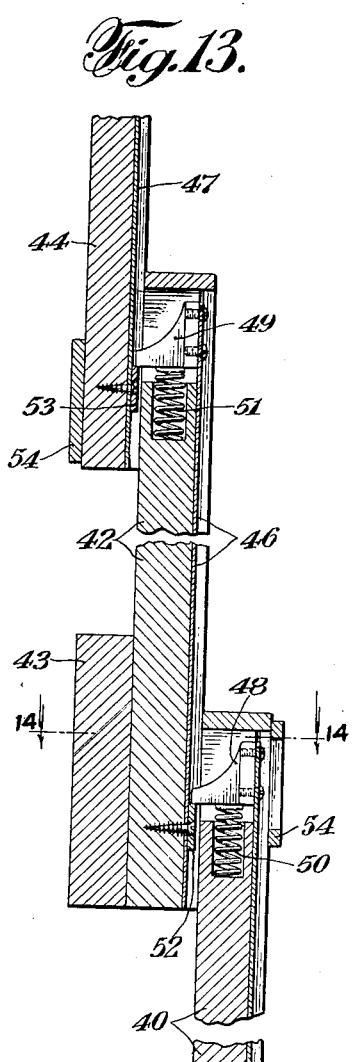
INVENTOR
Adolf W. Keuffel
BY his ATTORNEYS
Kenyon & Kenyon May 8, 1934.  A. W. KEUFFEL  1,957,838
LEVELING ROD
Filed May 7, 1931  3 Sheets-Sheet 3
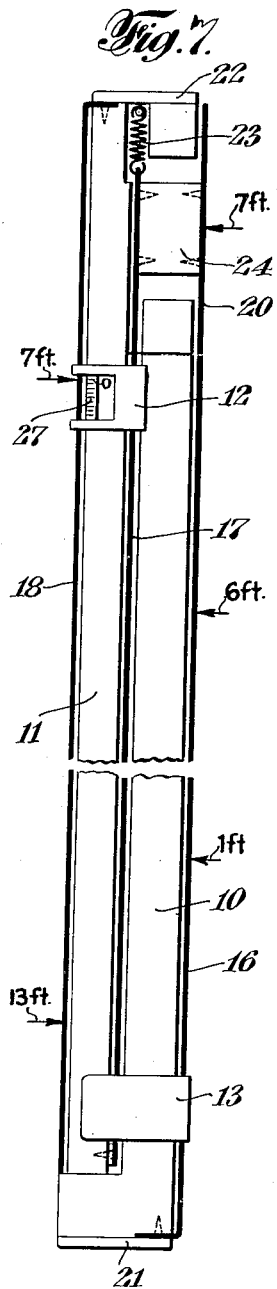
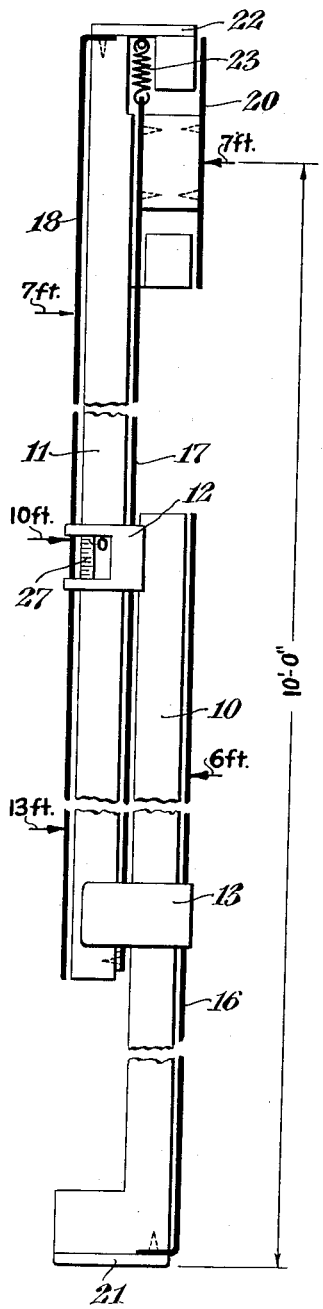
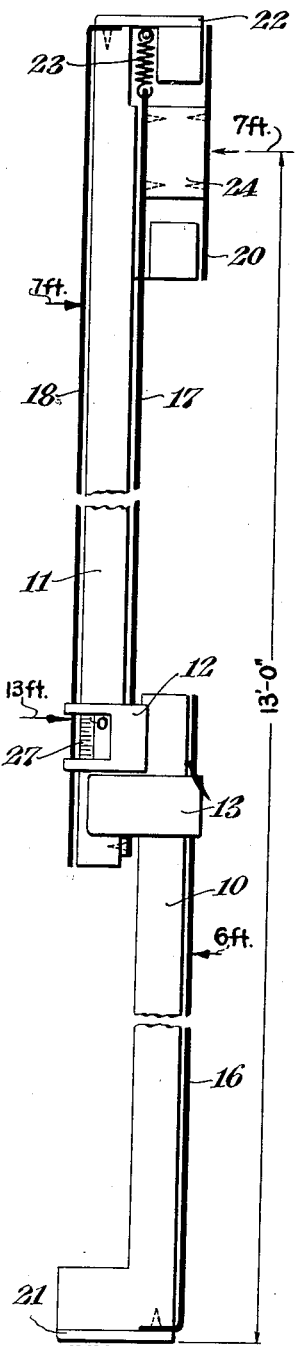
INVENTOR
Adolf W. Keuffel
BY Kenyon & Kenyon
ATTORNEYS Patented May 8, 1934

1,957,838

UNITED STATES PATENT OFFICE 1,957,838

LEVELING ROD

Adolf W. Keuffel, Montclair, N. J., assignor to Keuffel & Esser Co., Hoboken, N. J., a corporation of New Jersey Application May 7, 1931, Serial No. 535,643

18 Claims. (Cl. 33—74)

This invention relates to leveling rods and more particularly to leveling rods of the sectional extension type. Such rods usually heretofore have been made of wood with graduations or scales printed or painted on one or more faces of the sections. The wood from which the sections are made is subject to longitudinal expansion and contraction due to variation in the moisture content of the wood which changes with the relative humidity of the atmosphere. Variations in length of the rod due to variations in moisture content cannot be subjected to any physical law due to wide variations in the physical properties of wood and are uncontrollable. Such variations cannot accurately be allowed for as they lag behind the changes in the relative humidity of the atmosphere and cannot be accurately determined.

An object of this invention is a leveling rod such that the graduations are unaffected by longitudinal variations in the rod due to changes in the relative humidity of the atmosphere.

According to this invention graduated metal strips or metal scales are carried by the rod sections and extend along the faces of such sections, each metal strip being fixed to the rod at one end only and the remainder of the strip being slidably supported by the rod section. Thus, when the wood sections change in length due to variations in the relative humidity of the atmosphere, such variation has no effect upon the graduations. The fixed ends of the metal strips are so arranged relative to each other that accurate readings are always obtainable in any position of use of the sections.

Preferably, the graduated metal strips are arranged in grooves in the faces of the rod sections into or out of which they may be easily slid so that the metal strips may be easily replaced if the graduations become mutilated or obstructed. Also, the scales are protected against mutilation by contact with the other rod sections and are also firmly secured against displacement.

Other objects, novel features and advantages of this invention will be apparent from the following specification and accompanying drawings, wherein:

Fig. 1 is a front elevation of one type of leveling rod embodying the invention;
Fig. 2 is a rear elevation of such rod;
Fig. 3 is a section on the line 3—3 of Fig. 1 with the rod closed;
Fig. 4 is a similar view with the rod extended;
Fig. 5 is a section on the line 5—5 of Fig. 4;
Fig. 6 is a section on the line 6—6 of Fig. 4;
Figs. 7, 8 and 9 are diagrammatic illustrations of different positions of use of the leveling rod shown in Figs. 1 to 6 inclusive.
Fig. 10 is a vertical section similar to Fig. 3 of a modified form of the invention;
Fig. 11 is a section on the line 11—11 of Fig. 10;
Fig. 12 is a section on the line 12—12 of Fig. 10;
Fig. 13 is a vertical section through a different type of rod embodying the invention, and
Fig. 14 is a section on the line 14—14 of Fig. 13.

In the embodiment of the invention disclosed in Figs. 1 to 6 inclusive, the rod consists of two wooden sections 10 and 11, which are slidably connected to each other by means of guide members 12 and 13 at the inner ends of said rod sections, the guide member 12 being carried by the rod section 10, while the guide member 13 is carried by the rod section 11. An abutment member 14 is carried by the lower or outer end of the section 10 and an abutment member 15 is carried by the upper or outer end of the section 11. The abutment members 14 and 15 are adapted to be engaged by the ends of the sections 11 and 10 respectively to limit sliding movement of the sections in one direction while sliding movement of the sections in the opposite direction is limited by engagement of the guides 12 and 13. A metal graduated strip 16 is arranged on the front face of the section 10 while metal graduated strips 17 and 18 are provided on the front and rear faces of the section 11. A short graduated metal strip 20 is provided on the front face of the abutment member 15. Preferably, the sections and abutment members are provided with grooves having overhanging shoulders, thereby providing slots into which fit the edges of the various metal strips. The strips may be slid into position along the slots and the graduations on the faces of the strips will lie at the bottom of the groove formed in the sections and abutment members, but will be clearly visible. As the strips are arranged in the grooves the graduations will be protected against contact with the guide members 12 and 13 and also are protected against displacement or injury.

One end of the strip 16 is bent around the lower or outer end of the section 10 and is fixed thereto by a screw. One end of the strip 17 is substantially flush with the lower or inner end of the section 11 and is fixed thereto by means of a screw while the upper other end of the strip 18 is bent around the upper or outer end of the section 11 and is fixed to the section by means of a screw. A cap 21 overlies the lower or outer end of the section 10 and abutment member 14 while a cap 22 overlies the upper or outer end of the section 11 and the abutment member 15.

A spring 23 arranged in a groove in the abutment member 15 has one end connected to a carrier 24 arranged in a slot in said abutment member and has its other end attached to a pin 25 supported by the rod section 11 and the abutment member 15. The carrier 24 is attached to the free end of the metal strip 17 and also to the metal strip 20 which is freely slidable in the groove and the front face of the abutment 15. The guide member 12 is provided with clamping means 26 for clamping section 11 to section 10 and a vernier 27. A target 28 may be slid up and down on abutment member 15 and section 10. The spring 23 serves to keep the strip 17 taut, but may be dispensed with especially if the strip 17 is of substantial stiffness.

Figs. 7, 8 and 9 illustrate different positions of use of an extension leveling rod embodying the invention and known to the trade as a 13 foot heavy Philadelphia rod. Accurate readings are obtainable with this rod in any position of its sections regardless of the relative humidity of the atmosphere, allowance being made for expansion or contraction of the scales with changes of temperature, such allowance being accurately determinable from the known coefficient of expansion of the metal of the strips.

The metal scale 16 is rigidly fastened to the wooden section 10 at its lower end only and is numbered upwardly, the strip being between six and seven feet in length. The scale 16 is attached to the section 10 in such manner that its one foot mark is exactly one foot above the bottom of the shoe 21. The scale is accurately graduated and therefore the remaining graduations are at distances above the bottom of the shoe corresponding to their numbered values. Since the scale 16 is fastened to the section 10 only at the bottom, any change in length of the section 10 takes place as an independent action, the upper end of the section moving relative to the upper end of the scale, but the scale remaining in fixed relation with respect to the bottom of the shoe. Consequently, regardless of changes in length of the section 10, the graduations on the scale 16 will always be at distances above the bottom of the shoe corresponding to their numbered values.

The scale 17 is attached to the lower end only of the section 11 and is numbered upwardly to constitute a continuation of the scale 16. The scale 20 is supported solely by the carrier 24 and is also numbered upwardly in continuation of the scale 16 and the scale 20 is so mounted on the carrier 24 that its 7-foot mark coincides with the 13-foot mark on the scale 17. Despite variations in the length of the section 11, the scales 17 and 20 remain in fixed relation with respect to the bottom of said section. The scale 17 is initially mounted on the section 11 so that its 13 foot mark and the 7 foot mark of scale 20 are exactly one foot above the 6 foot mark on the scale 16 with the rod in closed position.

Irrespective of changes in length of the sections 10 and 11 due to variations in relative humidity of the atmosphere, the 7 foot mark on scale 20 will always be exactly 7 feet from the bottom of the shoe 21 with the rod in closed position. Suppose for example that atmospheric changes cause the section 10 to lengthen .005 feet. The scale 16 does not change position relative to the shoe 21, since it is rigidly held at the bottom of the section 10, but the upper end of the section 10 will have moved upwardly .005 feet with respect to the top of the scale 16. The section 11 is also lengthened .005 feet and its upper end is moved upwardly .005 feet with respect to the upper ends of scales 17 and 20, but these scales remain in fixed position with respect to the bottom of the section 11. Since there has been no change in position of scales 16, 17 and 20, the 7 foot mark on scale 20 remains exactly one foot above the 6 foot mark on scale 16 and therefore the 7 foot mark of scale 20 is exactly 7 feet from the bottom of the cap 21.

The scale 18 is attached at its upper end only to the section 11 and is numbered downwardly over the same range of numbers as scale 17. The scale 18 is initially attached to the section 11 so that, with the rod closed, its 7 foot mark coincides with the zero of the vernier 27. Irrespective of variations in length of the sections 10 and 11 the 7 foot mark of scale 18 will, with the rod in closed position, coincide with the zero of the vernier. Increase in length of the section 10 causes upward movement of the zero of the vernier, but there will be a corresponding upward movement of the scale 18 due to like increase in length of section 11 which causes upward movement of its upper end. Both the scale 18 and the vernier are moved upward the same amount and therefore the zero of the vernier will coincide with the 7-foot mark on the scale 18.

Extension of the rod to bring into register with the zero of the vernier a graduation on scale 18 lying between the 7 and 13 foot marks will result in locating the 7 foot mark of the scale 20 at a distance from the bottom of the shoe 21 corresponding to said graduation on scale 18. Suppose, for example, that the section 11 is lifted to bring the 10 foot mark of scale 18 into register with the zero of the vernier. This means that the section 11 has been moved exactly three feet and therefore the 7 foot mark on the scale 20 will also have been moved exactly 3 feet and consequently it will be exactly 10 feet from the bottom of the shoe 21. The same will be true with respect to any other setting of the rod. When the rod has been fully extended to bring the 13 foot mark of scale 18 into register with the zero of the vernier, then the 7 foot mark of the scale 20 will be exactly 13 feet from the bottom of the shoe 21 and since the 13 foot mark of the scale 17 coincides with the 7 foot mark of the scale 20 it also will be 13 feet from the bottom of the shoe 21, and the graduations on scale 17 will be at distances above the bottom of the shoe corresponding to their numbered values. Decreases in length of the sections 10 and 11 have the reverse action from that just described, but in this case as well, the scales 16, 17, 18 and 20 maintain their fixed relations so that accurate readings are always obtainable. It is thus apparent that leveling rods embodying the invention automatically compensate for variations in length of the sections due to changes in the relative humidity of the atmosphere.

Figs. 10, 11 and 12 disclose a modification of the same type of rod disclosed in Figs. 1 to 9 inclusive. In this modification, the rod section 10 is provided with a dove-tailed groove in its front face in which is arranged a tube 30, this tube being fastened at its upper end only to the upper or inner end of the rod section 10 and to the guide member 12. The scale 16 is arranged in a groove in the front face of the rod section 10 and is carried by the tube 30. The graduated metal strips 17 and 18 are carried by the section 11, the strip 17 being fastened to the section 11 at its inner end only, while the strip 18 is fastened to the section 11 at its outer end only. The scales 16 and 17 are so related that with the rod extended to bring the guide member 13 into contact with the guide member 12, the scale on the strip 17 is a true continuation of the scale on the strip 16. The cap or shoe 21 is fixed to the lower end of the tube 30 and is movable relative to the lower or outer end of the rod section 10 and abutment member 14. The metal strip 20 has its upper end bent over the upper end of the abutment member 15 and is fixed thereto by means of suitable screws. The shoe 21 is of such design and so attached to the tube 30 that its lower face coincides with the zero point of the scale 16. Again considering the 13 foot Philadelphia type leveling rod as an example, the scales are initially mounted on the wooden section so that with the rod closed the 7 foot mark of scale 20 is exactly one foot above the 6 foot mark of the scale 16 and the 7 foot mark of the scale 18 registers with the zero of the vernier 27, and, with the rod fully extended until the guide members 12 and 13 are in contact, the 7 foot mark of the scale 17 is exactly one foot above the 6 foot mark of the scale 16.

Accurate readings are also obtainable with the modified type of rod shown in Fig. 10 regardless of the relative humidity of the atmosphere, allowance being made for thermal expansion or contraction of the metal scales. With the rod closed, the upper ends of the scales 16 and 18 always register with each other in the same way irrespective of the expansion or contraction of the rod sections due to the fact that the change of length in the abutment members is inappreciable. Therefore, since the scales 18 and 20 have their corresponding ends fixed, the 7 foot mark of scale 20 will always be one foot above the 6 foot mark of the scale 16 and the 7 foot mark on the scale 18 will always register with the zero of the vernier 27. With the rod partially extended, the reading on scale 18 at zero of the vernier will accurately give the height of the 7 foot mark of the scale 20. With the rod fully extended the scale 17 will be a true continuation of the scale 16, due to the fact that the scale 17 is fixed to the section 11 at its lower end only and the scale 16 is fixed to the section 10 at its upper end only, thereby preventing relative movement of the scales due to expansion or contraction of the rod sections. In such position, the short scale 20 may not be in register with scale 17, and if direct surveying readings are made from this scale, they may have to be corrected. The shoe 21 will move relative to the lower end of the section 10 and the abutment member 14 to compensate for any changes in humidity.

In the multiple section rod disclosed in Figs. 13 and 14, the section 40 is provided at its lower end with an abutment member 41 and the section 42 is provided at its bottom end with an abutment member 43. The sections 40, 42 and 44 are slidably connected to each other by means of suitable guides 54. The section 40 carries a scale 45, the section 42 carries a scale 46 and the section 44 carries a scale 47, the scale in each instance being fixed only at its lower end to the rod section, and the remainder of the scale being slidable relative to the rod section. In the upper ends of the rod sections 40 and 42, there are provided recesses in which are arranged stop members 48 and 49 fixed to the upper ends of the scales 45 and 46 respectively. Springs 50 and 51 engage the stop members and serve to keep the scales taut. These springs are not essential and may be dispensed with especially if the strips 45 and 46 are of substantial rigidity. Each stop member has a projecting portion which engages a plate 52 or 53 carried by the lower end of the rod sections 42 and 44. When the rod is in its extended position, the plates 52 and 53 engage the stop members 48 and 49 and as the lower ends of the scale members are all fixed they always bear the same relation to each other regardless of expansion or contraction of the rod section due to changes in the relative humidity of the atmosphere. The scales are so arranged that each scale is a continuation of the other when the plates engage the stop members and therefore accurate readings are obtainable at all times.

In each of the modifications above described, the metal scales may be made of material having zero co-efficient of expansion. In such event, it will be unnecessary to correct for thermal expansion or contraction of the scales due to temperature variations.

It is of course to be understood that various structural modifications made be made in the devices above described, without in any way departing from the spirit of the invention as defined in the appended claims.

I claim:

1. An extensible leveling rod comprising sections of a material subject to change in dimensions with atmospheric changes of humidity, guide members carried by said sections and slidably connecting the same, and a graduated metal strip carried by each section, each metal strip having one end only fixed to the section by which it is carried and having its remainder slidably related to said section.

2. A leveling rod comprising two slidably connected sections composed of a material subject to change in dimensions with atmospheric changes of humidity, graduated metal strips carried by said sections, each of said metal strips being connected at one end only to the rod section by which it is carried, a third graduated metal strip slidably carried by one of said sections, and means connecting said last-named strip to the free end of the other strip carried by the same rod section.

3. A leveling rod comprising two slidably connected sections composed of a material subject to change in dimensions with atmospheric changes of humidity, graduated metal strips carried by said sections, one strip being fixed to one section at the outer end only of the section and the second strip being fixed to the second section only at the inner end thereof, and a graduated metal strip carried by said second section and being fixed to the free end of said second metal strip.

4. A leveling rod comprising first and second slidably connected sections composed of a material subject to change in dimensions with atmospheric changes of humidity, a graduated metal strip carried by the first section and being fixed thereto only at the outer end, a second graduated metal strip slidably carried by the second section, a third graduated metal strip carried by said second section and being fixed thereto only at the inner end of the section, and means connecting the free end of said third metal strip with said second metal strip.

5. A leveling rod comprising two slidably connected sections composed of a material subject to change in dimensions with atmospheric changes of humidity, a graduated metal strip carried by one section and being fixed thereto only at the outer end of said section, a pair of graduated metal strips carried by the second section, one of said strips being connected to said section only at the outer end of said section and the other strip being connected to said section only at the inner end of said section, and a fourth graduated metal strip slidably carried by said second section and being connected to the free end of the second of said pair of metal strips.

6. A leveling rod comprising two slidably connected wooden sections having abutment members at their opposite ends, a graduated metal strip carried by one section and being fixed thereto only at the abutment end of said section, a pair of graduated metal strips carried by the second section, one of said strips being connected to said section only at the abutment end of said section and the other strip being connected to said section only at the opposite end of said section, a graduated metal strip slidably carried by the abutment member of said second section and being connected to the free end of said last-named metal strip, and a reference member carried by said first section and cooperating with the graduated metal strip fixed to the abutment end of said second section.

7. A leveling rod comprising two slidably connected wooden sections, abutment members at opposite ends of said sections, metal graduated strips carried by said sections and being connected thereto only at the ends opposite said abutment members.

8. A leveling rod comprising two slidably connected sections composed of a material subject to change in dimensions with atmospheric changes of humidity, graduated metal strips carried by said sections and being connected thereto only at the inner ends, a third metal graduated strip carried by one of said sections and being connected to said section only at the outer end thereof.

9. A leveling rod comprising first and second slidably connected sections composed of a material subject to change in dimensions with atmospheric changes of humidity, a graduated metal strip carried by each section and being connected thereto only at the inner end thereof, a cap slidably carried by the outer end of the first section and being fixed to the free end of the strip carried by said section, a third graduated metal strip carried by the second section and being fixed thereto only at the outer end of said section.

10. A leveling rod comprising two slidably connected sections composed of a material subject to change in dimensions with atmospheric changes of humidity, a graduated metal strip carried by each section and being connected thereto only at the inner end thereof, a cap slidably carried by the outer end of the first section and being fixed to the free end of the strip carried by said section, a third graduated metal strip carried by the second section and being fixed thereto only at the abutment end of said section, and a reference member carried by said first section and cooperating with said last-named strip.

11. A leveling rod comprising a plurality of slidably connected sections composed of a material subject to change in dimensions with atmospheric changes of humidity, a graduated metal strip carried by each section and being connected thereto at one end only, certain of said metal strips being provided at their free end with stop members and certain of said sections being provided adjacent the end to which said strip is fixed with means to engage said stop members to limit relative movement of the sections.

12. A leveling rod comprising a plurality of slidably connected sections composed of a material subject to change in dimensions with atmospheric changes of humidity, a graduated metal strip carried by each section and being connected thereto at one end only, there being recesses in certain of said sections, stop members arranged in said recesses and being fixed to the free ends of the metal strips carried by said sections, and means carried by certain sections adjacent the end to which the strip is fixed to engage said stop members to limit relative movement of said sections.

13. A leveling rod comprising two slidably connected sections composed of a material subject to change in dimensions with atmospheric changes of humidity, one of said sections having a longitudinal groove, a metal member arranged in said groove and being fixed to said section at the inner end thereof only, a graduated metal strip carried by said member, a cap slidably carried by the outer end of the section and being fixed to the free end of said member, and a graduated metal strip carried by said other section and being fixed thereto only at the inner end of said section.

14. A leveling rod comprising two slidably connected sections composed of a material subject to change in dimensions with atmospheric changes of humidity, one of said sections having a longitudinal groove, a metal member arranged in said groove and being fixed to said section only at the inner end thereof, a graduated metal strip carried by said member, a cap slidably carried by the outer end of the section and being fixed to the free end of said member, and a pair of graduated metal strips carried by said other section, one of said strips being fixed to said section only at the inner end thereof and the other strip being fixed to said section only at the remaining end thereof.

15. A leveling rod comprising two slidably connected sections composed of material subject to dimensional changes with atmospheric changes of humidity, graduated metal strips carried by said sections and being connected thereto only at the inner ends thereof, and a cap slidably carried by the outer end of one section and being fixed to the free end of the strip carried by said section.

16. A leveling rod comprising two sections composed of material subject to dimensional changes with atmospheric changes of humidity, guide members carried by said sections and slidably connecting the same, a graduated metal strip carried by each section, each metal strip having one end only fixed to the section by which it is carried and having its remainder slidably related to said section, and means relating the graduated strip on one section to the graduated strip on the other section to render the graduated metal strips true extensions of each other.

17. A leveling rod comprising first and second sections composed of a material subject to change in dimensions with atmospheric changes of humidity, guide members carried by the inner ends of said sections and slidably connecting said sections, a first graduated metal strip carried by said first section and being fixed thereto only at the outer end of said first section with its remainder slidably related to said first section, a first index member supported by the first section at its inner end in fixed relation to said end, a second graduated metal strip carried by said second section and being fixed to said second section only at the inner end of said second section with its remainder slidably related to said second section, a second index member supported by said second section and arranged at the inner end thereof in fixed relation to the outer end of said second section whereby, upon registration of said index members, compensation is effected for change of dimensions in the sections to cause said graduated strips to form true extensions of each other.

18. A leveling rod comprising first and second sections composed of a material subject to change in dimensions with atmospheric changes of humidity, guide members carried by the inner ends of said sections and slidably connecting said sections, a first graduated metal strip carried by said first section and being fixed thereto only at the outer end of said first section with its remainder slidably related to said first section, a first index member supported by the first section at its inner end in fixed relation to said end, a second graduated metal strip carried by said second section and being fixed to said second section only at the inner end of said second section with its remainder slidably related to said second section, a second index member supported by said second section and arranged at the inner end thereof in fixed relation to the outer end of said second section whereby, upon registration of said index members, compensation is effected for change of dimensions in the sections to cause said graduated strips to form true extensions of each other, and a third graduated metal strip carried by the free end of said second graduated metal strip and forming an extension thereof.

ADOLF W. KEUFFEL.